US010750372B2

United States Patent
Kunjar et al.

(10) Patent No.: US 10,750,372 B2
(45) Date of Patent: Aug. 18, 2020

(54) OPERATION OF ACCESS POINTS AND AUTONOMOUS GROUP OWNERS

(71) Applicant: Cypress Semiconductor Corporation, San Jose, CA (US)

(72) Inventors: Dhruvaraja Kunjar, Munnekolala (IN); Vinoth Sampath, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/361,588

(22) Filed: Mar. 22, 2019

(65) Prior Publication Data

US 2020/0205009 A1   Jun. 25, 2020

Related U.S. Application Data

(60) Provisional application No. 62/782,847, filed on Dec. 20, 2018.

(51) Int. Cl.
| | |
|---|---|
| *H04W 72/00* | (2009.01) |
| *H04W 16/14* | (2009.01) |
| *H04W 72/02* | (2009.01) |
| H04W 88/10 | (2009.01) |

(52) U.S. Cl.
CPC .......... *H04W 16/14* (2013.01); *H04W 72/02* (2013.01); *H04W 88/10* (2013.01)

(58) Field of Classification Search
CPC ...... H04W 16/14; H04W 72/02; H04W 88/10
USPC .......................................... 455/450; 370/338
See application file for complete search history.

(56) References Cited

U.S. PATENT DOCUMENTS

| | | | |
|---|---|---|---|
| 7,120,138 B2 | 10/2006 | Soomro et al. |
| 7,606,193 B2 | 10/2009 | McFarland et al. |
| 7,864,744 B2 | 1/2011 | Song et al. |
| 9,578,595 B2 | 2/2017 | Hegde et al. |
| 9,736,697 B2 | 8/2017 | Park et al. |
| 10,051,558 B2 | 8/2018 | Phogat et al. |
| 10,063,904 B2 | 8/2018 | Morales et al. |
| 10,104,665 B2 | 10/2018 | Ngo et al. |
| 10,136,449 B2 | 11/2018 | Guo et al. |

(Continued)

FOREIGN PATENT DOCUMENTS

EP    1374618 B1    12/2011

OTHER PUBLICATIONS

Siobhan O'Gorman, "WiFi Combo Chip Features Real Simultaneous Dual Band Support", Mar. 3, 2015; 5 pages.

(Continued)

*Primary Examiner* — Marcos Batista (57) ABSTRACT

A system includes an apparatus and a station. The apparatus includes a first access point (AP) function configured to operate on a first channel of a first frequency band and a second AP function configured to operate on a second channel of a second frequency band. The apparatus also includes a processing device. In response to detecting that the second channel is unavailable for use by the second AP function, the processing device is configured to transition the second AP function to operate on a third channel of the first frequency band. The station can be used in an automotive application and is configured to communicate with the first AP function in the first frequency band, or communicate with the second AP function in the first frequency band or the second frequency band.

20 Claims, 6 Drawing Sheets

(56) References Cited

U.S. PATENT DOCUMENTS

| | | |
|---|---|---|
| 10,154,502 B2 | 12/2018 | Shapira |
| 2005/0063349 A1 | 3/2005 | Logalbo et al. |
| 2009/0116400 A1 | 5/2009 | Sekiya et al. |
| 2012/0213086 A1 | 8/2012 | Matsuura |
| 2013/0033995 A1* | 2/2013 | Kraglund .............. H04W 48/16 370/252 |
| 2013/0314267 A1 | 11/2013 | Kenney et al. |
| 2014/0301328 A1 | 10/2014 | Yacovitch |
| 2015/0208330 A1 | 7/2015 | Park et al. |
| 2019/0208567 A1* | 7/2019 | Seo ....................... H04W 24/08 |
| 2019/0364598 A1* | 11/2019 | Ringland ............. H04W 92/20 |

OTHER PUBLICATIONS

International Search Report for International Application No. PCT/US19/57346 dated Jan. 22, 2020; 2 pages.
Written Opinion of the International Searching Authority for International Application No. PCT/US19/57346 dated Jan. 22, 2020; 6 pages.

* cited by examiner

OPERATION OF ACCESS POINTS AND AUTONOMOUS GROUP OWNERS

CROSS-REFERENCE TO RELATED APPLICATIONS

This application claims the benefit of U.S. Provisional Application No. 62/782,847 filed on Dec. 20, 2018, the entire contents of which are hereby incorporated by reference.

TECHNICAL FIELD

Aspects of the present disclosure generally relate to wireless systems, and more particularly, to operation of access points and autonomous group owners in a wireless local area network (WLAN).

BACKGROUND

Dynamic frequency selection (DFS) is a mechanism that can allow a wireless local area network (WLAN) device (e.g., an access point or an autonomous group owner) to operate in the 5 gigahertz (GHz) frequency band without interfering with other systems (e.g., a radar system) operating in the 5 GHz frequency band. For example, an access point can operate in a channel of the 5 GHz frequency band if a radar signal is not detected on the channel. However, when a radar signal is detected on the channel, the access point may need to change to a new channel of the 5 GHz frequency band to avoid interfering with the radar system. Finding the new channel for the access point may take a long time period (e.g., from 1 to 10 minutes) in many scenarios, which may cause a significant disruption to stations or client devices connected to the access point.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The examples, implementations, and embodiments described herein may enable a smooth operation of an access point (AP) or an autonomous group owner (AGO) in different frequency bands in a wireless local area network (WLAN). For example, an AP can operate in a channel of the 5 gigahertz (GHz) frequency band if a radar signal is not detected on the channel. When a radar signal is detected on the channel, the AP can be transitioned to a channel of the 2.4 GHz frequency band without causing a disruption to stations (STAs) connected to the AP, as the AP can use channel switch announcement (CSA) feature to help guide connected stations (STAs) to the new channel. That is, the STAs connected to the AP can operate on the channel of the 2.4 GHz frequency band after the AP is transitioned to the channel of the 2.4 GHz frequency band. If a new channel of the 5 GHz frequency band is found for the AP without interfering with any radar system operating in the 5 GHz frequency band, the AP can be transitioned to the new channel. And the stations connected to the AP can also transition to operate in the new channel using AP's CSA advertisements.

Examples, implementations, and embodiments described herein are primarily described in the context of a WLAN network.

Figure 1:
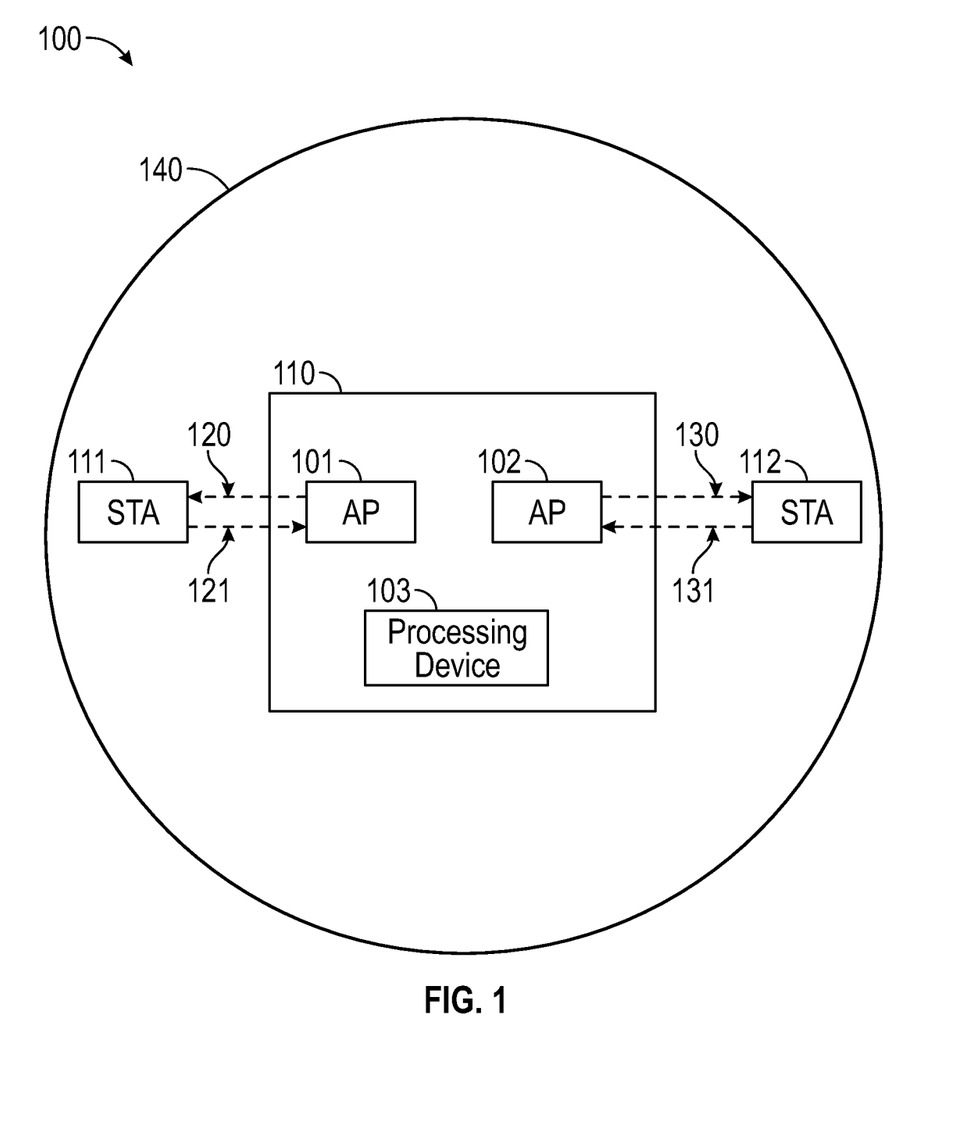
FIG. 1 illustrates an example architecture of a wireless system, in accordance with some embodiments of the present disclosure.

FIG. 1 illustrates an example architecture of a wireless system 100 in a WLAN network, in accordance with some embodiments of the present disclosure. In one embodiment, as shown in FIG. 1, the wireless system 100 may include an apparatus 110 and one or more stations such as STA 111 and STA 112. In one embodiment, the apparatus 110 can be a WLAN device and includes a first AP function 101, a second AP function AP 102, and a processing device 103.

The STAs 111 and 112 may be devices that can access the WLAN network, such as mobile devices or computers. The stations STA 111 and STA 112 can communicate with the AP 101 or the AP 102. As shown in FIG. 1, the STA 111 can communicate data with the AP 101. For example, the STA 111 can receive wireless radio-frequency (RF) signals carrying data packets (or data messages, frames, etc.) from the AP 101, as indicated by arrow 120. Also, the STA 111 can transmit wireless RF signals carrying data packets (or data messages, frames, etc.) to the AP 101, as indicated by arrow 121. Similarly, the STA 112 can communicate data with the AP 102, as indicated by arrows 130 and 131. The STAs 111 and 112 may be used in automotive applications such as automotive infotainment applications. As also shown in FIG. 1, the circle 140 may represent the range of the RF signals transmitted between the STAs 111 and 112 and the APs 101 and 102. When the STAs 111 and 112 and the APs 101 and 102 are located within the circle 140, data can be transmitted wirelessly between the STAs 111 and 112 and the APs 101 and 102. In some examples, the apparatus 110 may include an internal STA functionality (e.g., within the apparatus 110) that may be connected to an external AP (different from the APs 101 and 102).

The processing device 103 may be provided by one or more general-purpose processing devices such as a microprocessor, central processing unit, or the like. In an illustrative example, processing device 103 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 103 may also comprise one or more special-purpose processing devices such as an application specific integrated circuit (ASIC), a field programmable gate array (FPGA), a digital signal processor (DSP), network processor, or the like. The processing device 103 may be configured to execute some operations described herein, in accordance with one or more aspects of the present disclosure, for performing some operations and steps discussed herein.

In one embodiment, the AP 101 operates on a first channel of a first frequency band. The first frequency band can be the 2.4 GHz frequency band. The AP 101 can be operable in at least one of the first frequency band and a second frequency band. The second frequency band can be the 5 GHz frequency band. In one embodiment, the AP 102 operates on a second channel of the second frequency band. The AP 102 can be operable in both the first frequency band (i.e., the 2.4 GHz frequency band) and the second frequency band (i.e., the 5 GHz frequency band). In one embodiment, the AP 101 and AP 102 are integrated in a single integrated circuit. The single integrated circuit or chip may support multi-basic service sets (MBSS). That is, the single integrated circuit or chip may support more than one beaconing entity (AP or AGO) operating in the same frequency band or channel. In some examples, the AP 101 and AP 102, and the internal STA may be integrated in a single integrated circuit. The internal STA may be operable in at least one of the first frequency band (i.e., the 2.4 GHz frequency band) and the second frequency band (i.e., the 5 GHz frequency band).

In one embodiment, the apparatus 110 supports dynamic frequency selection (DFS). The AP 102 operates on the second channel that is a DFS channel of the 5 GHz frequency band. In one embodiment, the AP 102 can detect that a radar system is operating on the second channel of the 5 GHz frequency band, i.e., the second channel is unavailable for use by the AP 102. In this embodiment, to avoid interfering with the radar system, the processing device 103, in response to detecting that the second channel is unavailable for use by the AP 102, can transition the AP 102 to operate on a third channel of the 2.4 GHz frequency band. Thus, the AP 102 is transitioned to operate on the third channel of the 2.4 GHz frequency band without interfering with the radar system operating in the second channel of the 5 GHz frequency band. In this embodiment, the STA 112 can also transition to operate on the third channel to communicate data with the AP 102. For example, the AP 102 can send a channel switch announcement (CSA) to the STA 112 to notify the STA 112 to transition to the third channel of the 2.4 GHz frequency band.

In one embodiment, the third channel of the 2.4 GHz frequency band may be different from the first channel of the 2.4 GHz frequency band that the AP 101 operates on. In another embodiment, the third channel of the 2.4 GHz frequency band may be the same as the first channel of the 2.4 GHz frequency band that the AP 101 operates on. That is, after the transition of the AP 102, the AP 101 and the AP 102 may operate on the same channel of the 2.4 GHz frequency band. The apparatus 110 may support MBSS. Thus, the AP 101 and AP 102 may operate in the same frequency band, e.g., the 2.4 GHz frequency band.

In one embodiment, after the AP 102 is transitioned to the third channel of the 2.4 GHz frequency band, the processing device 103 can scan the channels in the 5 GHz frequency band to find or select a new channel that does not interfere with any radar system operating in the 5 GHz frequency band. That is, the new channel of the 5 GHz frequency band can be available for use by the AP 102. In this embodiment, the apparatus 110 may support real-time simultaneous dual-band (RSDB) such that the apparatus 110 can communicate using both the 2.4 GHz and the 5 GHz frequency bands at the same time. With RSDB support, the AP 102 may operate on the third channel of the 2.4 GHz frequency band while simultaneously the processing device 103 can scan the channels in the 5 GHz frequency band to find or select the new channel.

In one embodiment, after the new channel of the 5 GHz frequency band is found or selected, the processing device 103 can further transition the AP 102 from the third channel of the 2.4 GHz frequency band to operate on the new channel of the 5 GHz frequency band in response to detecting that the new channel is available for use by the AP 102. In this embodiment, the STA 112 can also transition to operate on the new channel of the 5 GHz frequency band to communicate data with the AP 102.

Figure 2:
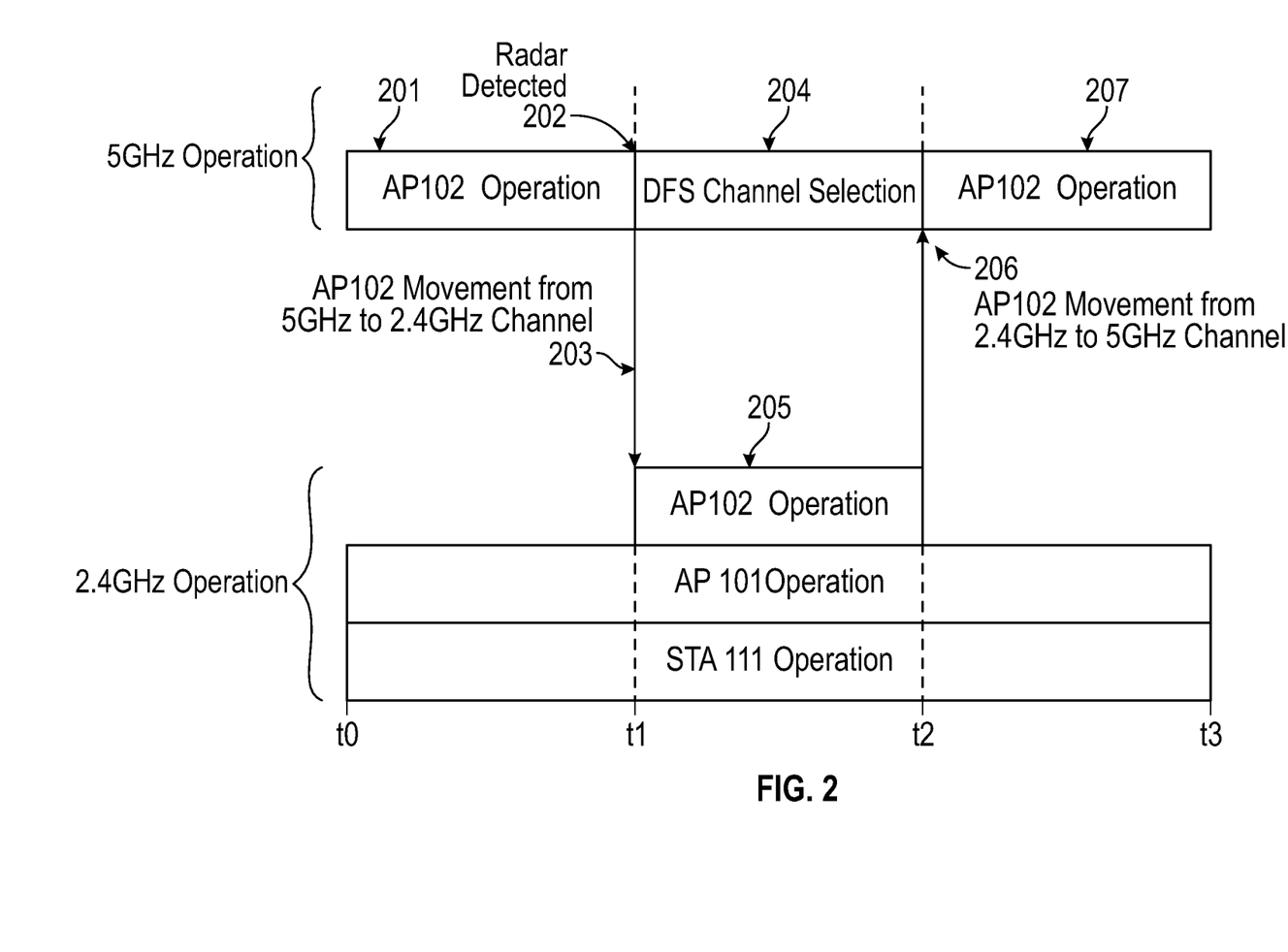
FIG. 2 illustrates an example process of transitioning an access point in different frequency bands, in accordance with some embodiments of the present disclosure.

FIG. 2 illustrates an example process of transitioning an access point in different frequency bands, in accordance with some embodiments of the present disclosure. In one embodiment, as shown in FIG. 2, the AP 101 may operate on a first channel of the 2.4 GHz frequency band. The STA 111 connected to the AP 101 may also operate on the first channel of the 2.4 GHz frequency band to communicate with the AP 101. On the other hand, the AP 102 may operate on a second channel of the 5 GHz frequency band when no radar signal is detected on the second channel, as indicated by arrow 201 in a time period from time t0 to time t1. The STA 112 can also operate on the second channel of the 5 GHz frequency band to connect with the AP 102. The second channel can be a DFS channel.

In one embodiment, when a radar signal is detected on the second channel, as indicated by arrow 202, the processing device 103 can transition the AP 102 to operate on a third channel of the 2.4 GHz frequency band, as indicated by arrow 203. As explained above, the third channel of the 2.4 GHz frequency band may be the same as or different from the first channel of the 2.4 GHz frequency band that the AP 101 operates on.

In one embodiment, as also shown in FIG. 2, the processing device 103 can perform a DFS channel selection to find or select a new channel that does not interfere with any radar system operating in the 5 GHz frequency band, as indicated by arrow 204 in a time period from time t1 to time t2. During the time period of the DFS channel selection (from time t1 to time t2), the AP 102 can operate on the third channel of the 2.4 GHz frequency band, as indicated by arrow 205. And the STA 112 can also transition to operate on the third channel to communicate data with the AP 102 without being disrupted by the DFS channel selection.

After the new channel of the 5 GHz frequency band is found or selected, the new channel can be available for use by the AP 102. In one embodiment, the processing device 103 can transition the AP 102 from the third channel of the 2.4 GHz frequency band to operate on the new channel of the 5 GHz frequency band in response to detecting that the new channel is available for use by the AP 102, as indicated by arrow 206. That is, the AP 102 can operate on the new channel of the 5 GHz frequency band without interfering with any radar system operating in the 5 GHz frequency band, as indicated by arrow 207 in a time period from time t2 to time t3. In this embodiment, the STA 112 can also transition to operate on the new channel to communicate data with the AP 102. For example, the AP 102 can send a CSA to the STA 112 to notify the STA 112 to transition to the new channel of the 5 GHz frequency band.

In one embodiment, the one or more channels used by the AP 102 in the 5 GHz frequency band may be DFS channels. In other embodiments, the one or more channels used by the AP 102 in the 5 GHz frequency band may not be DFS channels. In some embodiments, the first and second frequency bands may be frequency bands other than the 2.4 GHz frequency band and the 5 GHz frequency band.

Figure 3:
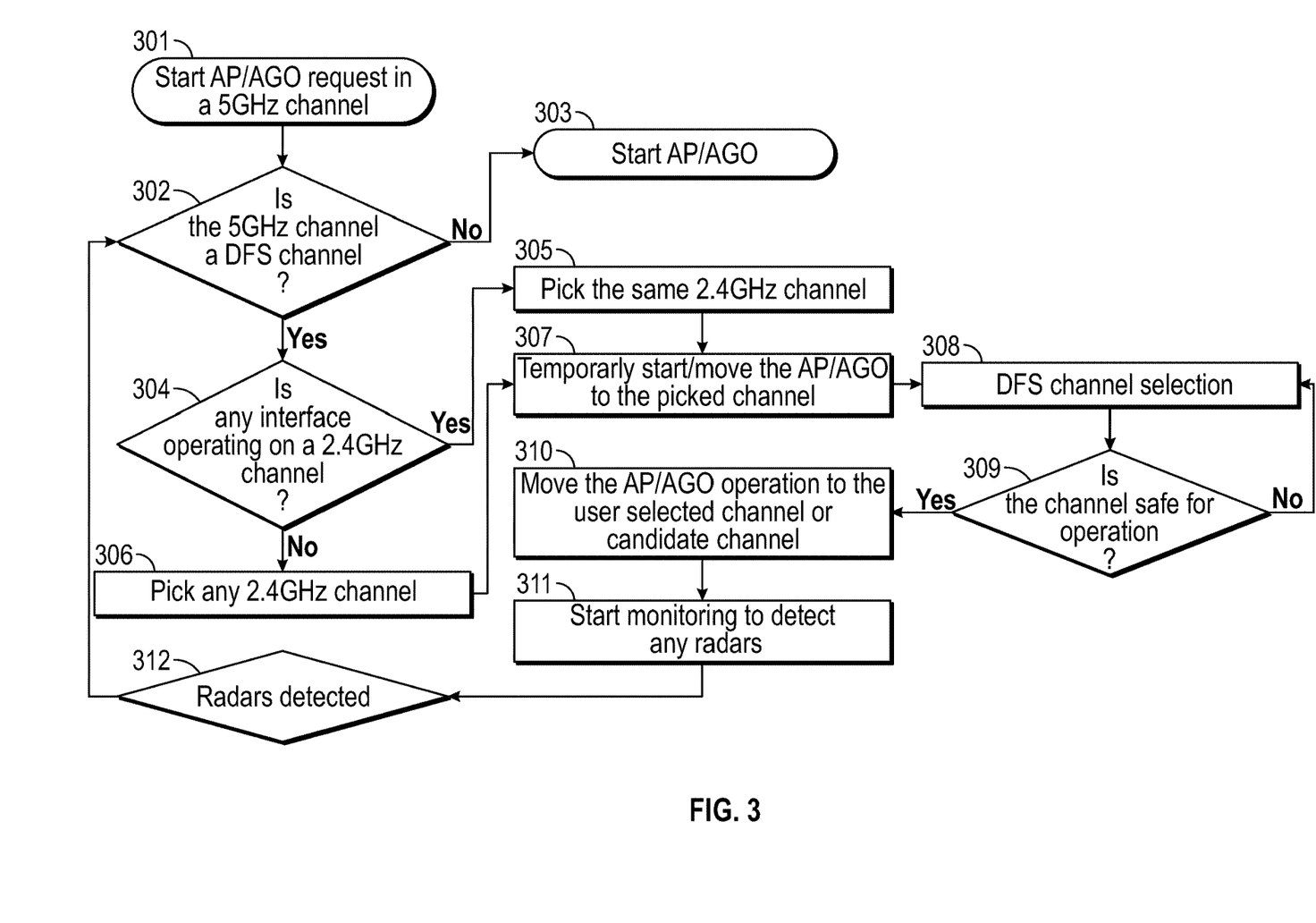
FIG. 3 illustrates a flow diagram of a method of operation of an access point or autonomous group owner in a wireless local area network (WLAN), in accordance with one embodiment of the present disclosure.

FIG. 3 is a flow diagram of a method illustrating an example process 300 of operation of an AP or AGO in different frequency bands, in accordance with one embodiment of the present disclosure. The process 300 may be performed by the apparatus 110. In one embodiment, as shown in FIG. 3, at block 301, the processing device 103 can start a request to operate an AP or AGO on a channel of the 5 GHz frequency band. At block 302, the processing device 103 can determine whether the requested channel is a DFS channel. If not, the process 300 can proceed to block 303. At block 303, the AP or AGO can start to operate on the channel of the 5 GHz frequency band.

On the other hand, if the requested channel is a DFS channel, a DFS channel selection or scan should be performed before the AP or AGO can start operating on the channel. The DFS channel selection can detect if a radar system is operating on the requested channel such that the AP or AGO may not start operating on the requested channel. The DFS channel selection may require 1-10 minutes to complete. If the requested channel is a DFS channel, the process 300 can proceed to block 304. At block 304, the processing device 103 can determine whether an interface such as another AP or AGO is already operating on a channel of the 2.4 GHz frequency band. If so, the processing device 103 can pick or select the same channel of the 2.4 GHz frequency band for transitioning the AP or AGO, as shown at block 305. If not, the processing device 103 can pick any channel of the 2.4 GHz frequency band for transitioning the AP or AGO, as shown at block 306.

The process 300 can proceed to block 307 from block 305 or 306. At block 307, the processing device 103 can temporarily start or move the AP or AGO to operate on the picked channel of the 2.4 GHz frequency band. Stations connected to the AP or AGO can also operate on the picked channel to communicate data with the AP or AGO. For supporting more than one beaconing entity (AP or AGO) operating in the same frequency band or channel, the apparatus 110 may support MBSS.

At block 308, the processing device 103 can perform DFS channel selection to find or select a channel of the 5 GHz frequency band for use by the AP or AGO. For example, the processing device 103 can perform a DFS-channel availability check (CAC) to determine whether a user selected channel or a candidate channel of the 5 GHz frequency band is available for the AP or AGO to operate on. In one example, if no radar signal is detected on the selected channel or candidate channel, the selected channel or candidate channel is available for the AP or AGO to operate on. Otherwise, the selected channel or candidate channel is not available for the AP or AGO to operate on. During the time period of the DFS selection, the AP or AGO can temporarily operate on the picked channel of the 2.4 GHz frequency band.

At block 309, if the processing device 103 determines that the selected channel or candidate channel is not available for the AP or AGO to operate on, the process 300 can proceed back to block 308 to continue to perform DFS channel selection. On the other hand, at block 309, if the processing device 103 determines that the selected channel or candidate channel is available for the AP or AGO to operate on, the process 300 can proceed to block 310. At block 310, the processing device 103 can transition or move the AP or AGO from the picked channel of the 2.4 GHz frequency band to operate on the selected channel or candidate channel of the 5 GHz frequency band. In one example, the AP or AGO can send one or more CSAs to stations connected to the AP or AGO to notify the stations to transition to the selected channel or candidate channel of the 5 GHz frequency band.

At block 311, the AP or AGO can start in-service monitoring to detect any radar system operating on the selected channel or candidate channel of the 5 GHz frequency band. If a radar signal is detected on the selected channel or candidate channel, as shown at block 312, the process 300 can proceed back to block 304 to start the transition of the AP or AGO to operate in the 2.4 GHz frequency band to avoid interfering with the detected radar system.

Figure 4A:
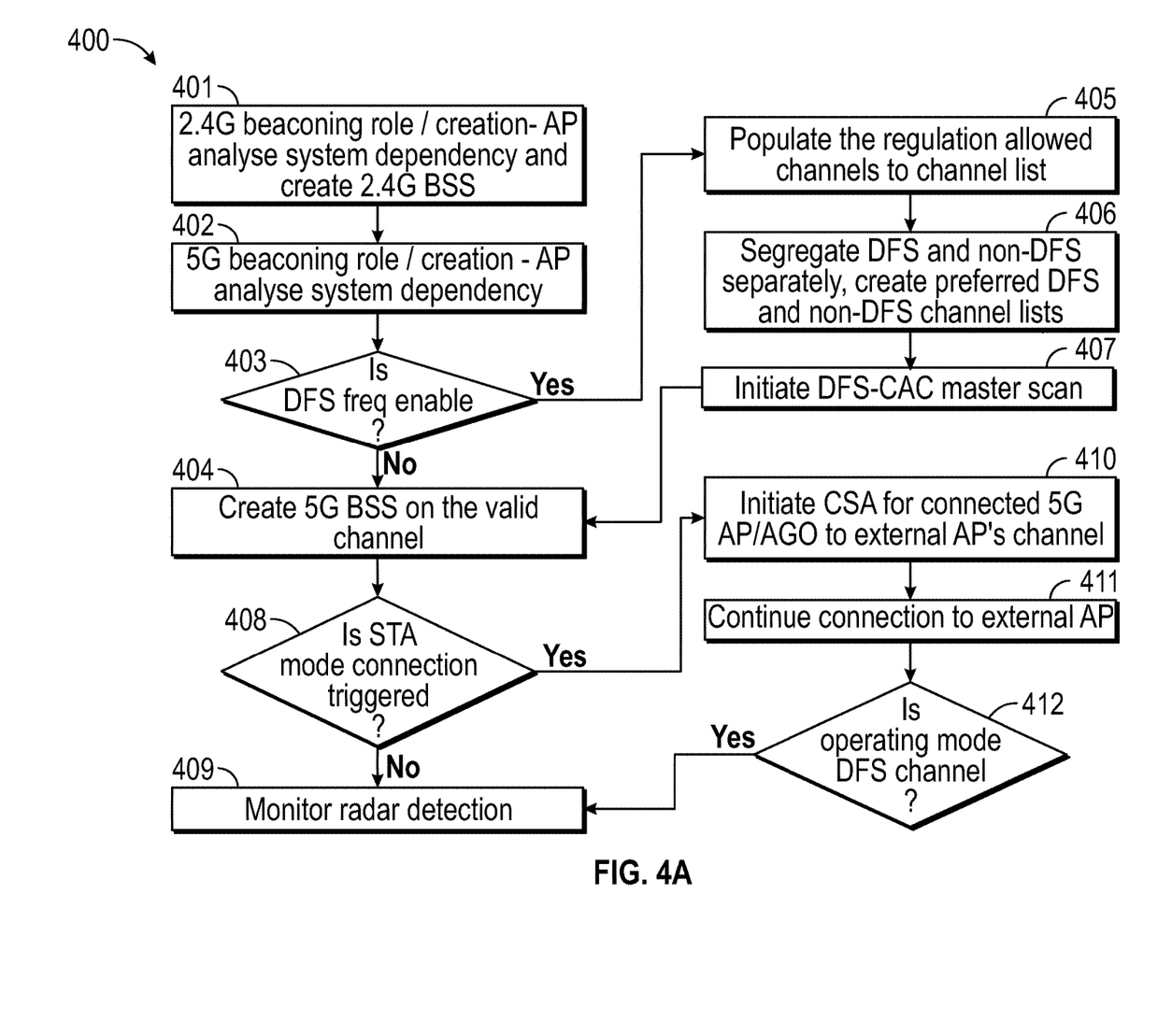
FIGS. 4A and 4B illustrate a flow diagram of a method of operation of an access point or autonomous group owner in a WLAN, in accordance with another embodiment of the present disclosure.
Figure 4B:
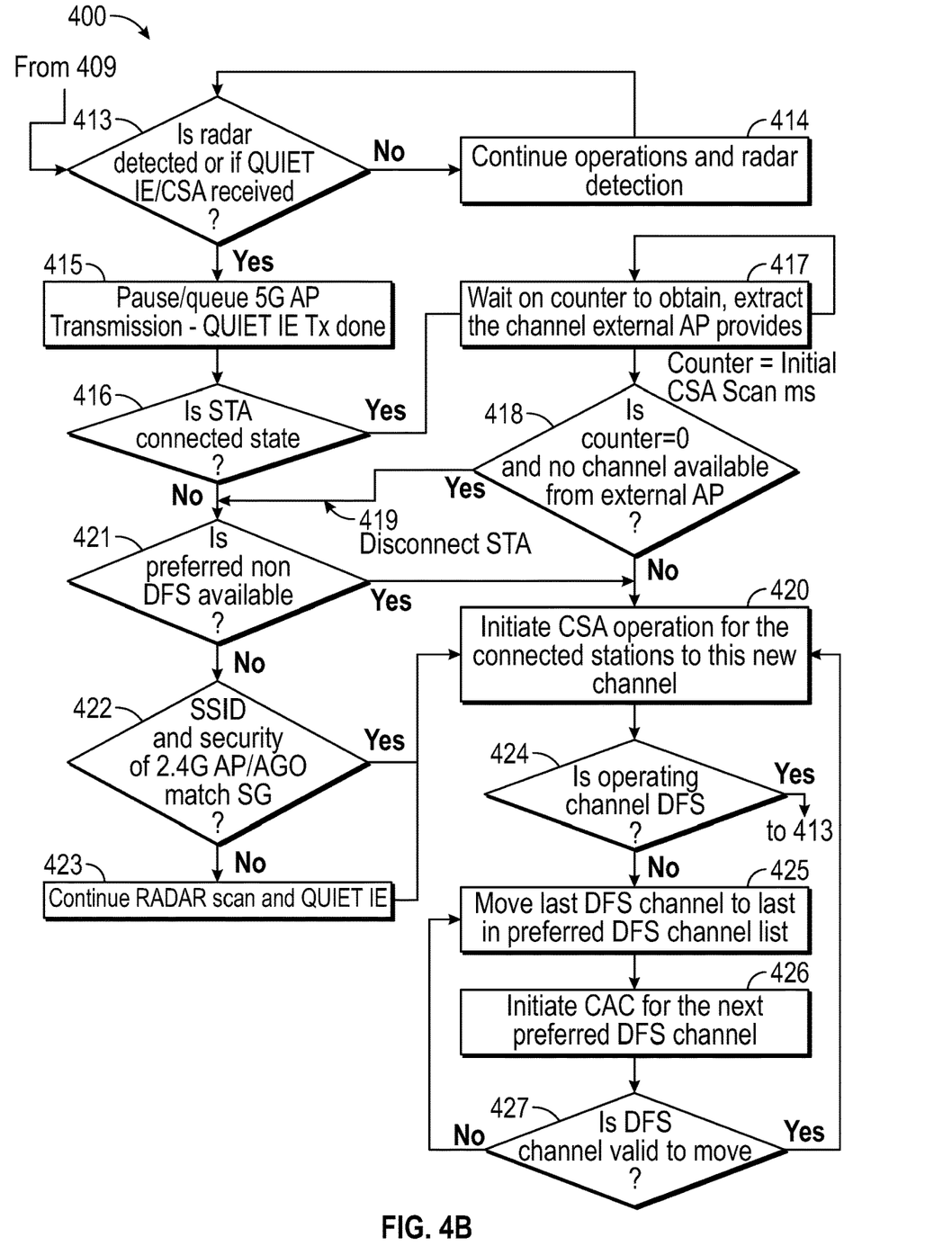

FIGS. 4A and 4B include a flow diagram of a method illustrating an example process 400 of operation of an access point or autonomous group owner in different frequency bands, in accordance with another embodiment of the present disclosure. The process 400 may be performed by the apparatus 110. In the process 400, the apparatus 110 may include an internal STA functionality (e.g., within the apparatus 110) that may be connected to an external AP (different from the APs 101 and 102). As shown in FIG. 4A, at block 401, the beacon role (e.g., the AP 101) in the 2.4 GHz frequency band can be created. The AP 101 can analyze the system dependency and create BSS in the 2.4 GHz frequency band. At block 402, the processing device 103 can decide to start AP 102 in the 5 GHz frequency band and start analyzing the system dependencies before the beacon role (e.g., the AP 102) in the 5 GHz frequency band can be created.

At block 403, the processing device 103 can determine whether DFS channels are enabled. For example, some countries may enable the DFS channels and other countries may not. If the DFS channels are not enabled, the process 400 may proceed directly from block 403 to block 404. At block 404, the AP 102 can create BSS on a valid channel of the 5 GHz frequency band, which in this case may be one of the non-DFS channels of the 5 GHz frequency band On the other hand, if the DFS channels are enabled, the process 400 may proceed from block 403 to block 405. At block 405, the processing device 103 may create a regulatory allowed channel list of 5 GHz frequency band. At block 406, DFS channels and non-DFS channels can be segregated in the channel list and are arranged in the order of preference. At block 407, the processing device 103 can go through the preferred channel list in the order of preference, analyze each channel and determine if it can start AP 102. During this iteration, if the selected channel is a DFS channel, the processing device 103 can perform a DFS-CAC scan to determine if there is any radar signal interference in that channel. If radar signal interference is found, the selected channel can be considered as an invalid channel and the search can continue with the next channel. If the selected channel is not a DFS channel, the DFS-CAC scan may be skipped and the selected channel can be used to start AP 102 directly. At the end of processing in block 407, a valid DFS or non-DFS channel is found, the process 400 can proceed from block 407 to block 404 to start AP 102 in the selected channel.

The process 400 can proceed from block 404 to block 408. At block 408, the processing device 103 can monitor the internal STA functionality for triggering of any association activity with the external AP. If the STA mode connection is not triggered, the process 400 may proceed from block 408 to block 409. At block 409, if the operating channel is a DFS channel, the AP 102 can perform DFS in-service monitoring (DFS-ISM) for radar signals while it is operating.

On the other hand, at block 408, if the processing device 103 detects that the STA mode connection is triggered, the process 400 may proceed from block 408 to block 410. At block 410, CSA can be initiated by the AP (e.g., the AP 102) or AGO to transition to the external AP's channel of the 5 GHz frequency band along with its connected STAs (e.g., STA 112). Once AP 102 transitions to external AP's channel, the STA can continue to connect to the external AP, as shown at block 411. If the AP or AGO operates on a DFS channel, as shown at block 412, the process 400 may proceed from block 412 to block 409 to perform DFS-ISM, and monitor radar signals on the DFS channel of the 5 GHz frequency band, while it is operating.

The process 400 can proceed from block 409 to block 413, as shown in FIG. 4B. At block 413, the AP 102 can determine whether a radar signal is detected on the current operating channel of the 5 GHz frequency band, or whether the internal STA functionality connected to the external AP has received any Quiet information element (IE) and/or CSA is received from the external AP. If the internal STA functionality receives Quiet IE and/or CSA from the external AP, it may indicate that the external AP detects the radar first (e.g., earlier than the AP 102). If no radar is detected or no Quiet IE and/or CSA is received, the AP 102 can continue operations on the channel of the 5 GHz frequency band and radar detection, as shown at block 414.

On the other hand, if a radar signal is detected or Quiet IE and/or CSA is received, the process 400 may proceed from block 413 to block 415. At block 415, the AP 102 can send out frames with Quiet IE to its connected STAs (e.g., STA 112) and all further packet transmission is paused or queued.

At block 416, a connected state of the internal STA functionality is determined. If the internal STA is connected, the process 400 may proceed from block 416 to block 417. At block 417, the AP 102 can wait for a timeout period by using a timer counter and wait for CSA frame from the external AP to the internal STA interface. If the CSA frame is received within the timeout period, AP 102 can extract new channel to transition as provided by the external AP. If the counter value is zero indicating time out and AP 102 does not receive CSA frame from the external AP to the internal STA, i.e., no channel transition information from the external AP, as shown at block 418, the internal STA can be disconnected from external AP, as indicated by arrow 419. If the counter is not zero and a channel is available from the external AP to the internal STA functionality to transition, the process 400 may proceed from block 419 to block 420. At block 420, AP 102 can initiate CSA operation to guide the connected STAs (e.g., STA 112) to the next channel to transition.

On the other hand, if the internal STA is not connected, the process 400 may proceed from block 416 to block 421. At block 421, if a preferred non-DFS channel is available, the process 400 may proceed from block 421 to block 420. However, if a preferred non-DFS channel is not available, the process 400 may proceed from block 421 to block 422. If the service set identifier (SSID) and security credentials of the AP or AGO (e.g., AP 101) operating in the 2.4 GHz frequency band match the SSID and security credentials of the AP or AGO (e.g., AP 102) operating in the 5 GHz frequency band, the process 400 may proceed from block 422 to block 420. Otherwise, the process 400 may proceed from block 422 to block 423. At block 423, the AP 102 can continue to scan the channel to detect a radar signal and does not transmit for the time period indicated by Quiet IE. If an available channel is found, the process 400 may proceed from block 423 to block 420.

As explained above, at block 420, CSA operation can be initiated for the connected stations to guide them to the next channel to transition. Then the process 400 may proceed from block 420 to block 424. If at block 424, the AP or AGO (e.g., AP 112) operates on a DFS channel, the process 400 may proceed from block 424 back to block 413 where it can perform DFS-ISM along with its regular operations. If the AP or AGO (e.g., AP 112) does not operate on a DFS channel, the process 400 may proceed from block 424 to block 425.

At block 425, the last DFS channel that a radar signal is detected on may be moved to the last position in the preferred DFS channel list. That is, the last DFS channel may have a low priority in the preferred DFS channel list for use by the AP 102. Then CAC can be initiated for the next preferred DFS channel in the channel list, as shown at block 426. The process 400 may proceed from block 426 to block 427. If the next preferred DFS channel is valid for the AP 102 to move, the process 400 may proceed from block 427 to block 420 to initiate CSA operation. If the next preferred DFS channel is not valid for the AP 102 to move, the process 400 may proceed from block 427 to block 424 to update the preferred DFS channel list.

Figure 5:
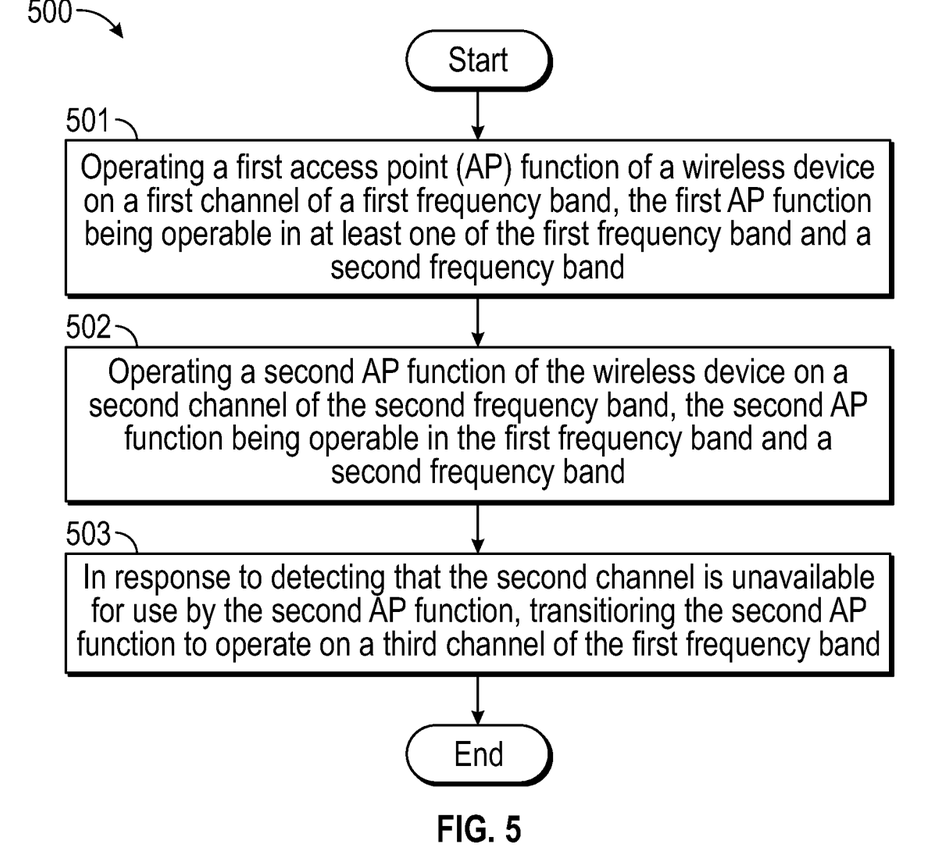
FIG. 5 illustrates a flow diagram of a method of transitioning an access point in different frequency bands, in accordance with some embodiments of the present disclosure.

FIG. 5 illustrates a flow diagram of a method 500 of transitioning an access point in different frequency bands, in accordance with some embodiments of the present disclosure. In some embodiments, the method 500 may be performed by the apparatus 110.

The method 500 begins at block 501, where the method 500 comprises operating a first AP function (AP 101) of a wireless device (apparatus 110) on a first channel of a first frequency band, the first AP function being operable in at least one of the first frequency band and a second frequency band. The first frequency band may be a 2.4 gigahertz (GHz) frequency band, and the second frequency band may be a 5 GHz frequency band. The apparatus 110 may support DFS, and the second channel may be a DFS channel.

At block 502, the method 500 comprises operating a second AP function (AP 102) of the wireless device on a second channel of the second frequency band, the second AP function being operable in the first frequency band and the second frequency band. The first AP function and the second AP function may be integrated in a single integrated circuit.

At block 503, the method 500 comprises: in response to detecting that the second channel is unavailable for use by the second AP function, transitioning the second AP function to operate on a third channel of the first frequency band. The third channel maybe the same as or different from the first channel.

The method 500 may further comprise transitioning the second AP function from the third channel to operate on a fourth channel of the second frequency band in response to detecting that the fourth channel is available for use by the second AP function.

The method 500 described above can be used for operating one or more APs or AGOs in a WLAN network.

Unless specifically stated otherwise, terms such as "receiving," "generating," "verifying," "performing," "correcting," "identifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   operating a first access point (AP) function of a wireless device on a first channel of a first frequency band, the first AP function being operable in at least one of the first frequency band and a second frequency band;
   operating a second AP function of the wireless device on a second channel of the second frequency band, the second AP function being operable in the first frequency band and the second frequency band; and
   in response to detecting that the second channel may be unavailable for use by the second AP function, transitioning the second AP function to operate on a third channel of the first frequency band while the second channel is verified to determine whether the second channel is available for use by the second AP function.

2. The method of claim 1, wherein the third channel is different from the first channel.

3. The method of claim 1, wherein the third channel is the same as the first channel.

4. The method of claim 1, wherein the first frequency band includes a 2.4 gigahertz (GHz) frequency band, and wherein the second frequency band includes a 5 GHz frequency band.

5. The method of claim 1, wherein the wireless device supports dynamic frequency selection (DFS), and wherein the second channel is a DFS channel.

6. The method of claim 1, further comprising transitioning the second AP function from the third channel to operate on the second channel of the second frequency band in response to determining that the second channel is available for use by the second AP function.

7. The method of claim 1, wherein the first AP function and the second AP function are integrated in a single integrated circuit.

8. An apparatus, comprising:
   a first access point (AP) function configured to operate on a first channel of a first frequency band, the first AP function being operable in at least one of the first frequency band and a second frequency band;
   a second AP function configured to operate on a second channel of the second frequency band, the second AP function being operable in the first frequency band and the second frequency band; and
   a processing device, in response to detecting that the second channel may be unavailable for use by the second AP function, configured to transition the second AP function to operate on a third channel of the first frequency band while the processing device is configured to determine whether the second channel is available for use by the second AP function.

9. The apparatus of claim 8, wherein the third channel is different from the first channel.

10. The apparatus of claim 8, wherein the third channel is the same as the first channel.

11. The apparatus of claim 8, wherein the first frequency band includes a 2.4 gigahertz (GHz) frequency band, and wherein the second frequency band includes a 5 GHz frequency band.

12. The apparatus of claim 8, wherein the apparatus supports dynamic frequency selection (DFS), and wherein the second channel is a DFS channel.

13. The apparatus of claim 8, wherein the processing device is further configured to transition the second AP function from the third channel to operate on the second channel of the second frequency band in response to determining that the second channel is available for use by the second AP function.

14. The apparatus of claim 8, wherein the first AP function and the second AP function are integrated in a single integrated circuit.

15. A system, comprising:
   an apparatus, comprising:
   a first access point (AP) function configured to operate on a first channel of a first frequency band, the first AP function being operable in at least one of the first frequency band and a second frequency band;
   a second AP function configured to operate on a second channel of the second frequency band, the second AP function being operable in the first frequency band and the second frequency band; and
   a processing device in response to detecting that the second channel may be unavailable for use by the second AP function, configured to transition the second AP function to operate on a third channel of the first frequency band while the processing device is configured to determine whether the second channel is available for use by the second AP function; and
   a station in an automotive application configured to communicate with the first AP function in the first frequency band, or communicate with the second AP function in the first frequency band or the second frequency band.

16. The system of claim 15, wherein the third channel is different from the first channel.

17. The system of claim 15, wherein the first frequency band includes a 2.4 gigahertz (GHz) frequency band, and wherein the second frequency band includes a 5 GHz frequency band.

18. The system of claim 15, wherein the apparatus supports dynamic frequency selection (DFS), and wherein the second channel is a DFS channel.

19. The system of claim 15, wherein the processing device is further configured to transition the second AP function from the third channel to operate on the second channel of the second frequency band in response to determining that the second channel is available for use by the second AP function.

20. The system of claim 15, wherein the first AP function and the second AP function are integrated in a single integrated circuit.

* * * * *